(12) United States Patent
Zdornov et al.

(10) Patent No.: US 12,032,531 B1
(45) Date of Patent: Jul. 9, 2024

(54) FILESYSTEM PATHNAMES INDEXING USING PATH CHANGE ANNEX

(71) Applicant: VAST DATA LTD., Tel Aviv (IL)

(72) Inventors: Vlad Zdornov, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/162,700

(22) Filed: Jan. 31, 2023

(51) Int. Cl.
*G06F 16/13* (2019.01)
*G06F 16/16* (2019.01)
*G06F 16/17* (2019.01)
*G06F 16/185* (2019.01)

(52) U.S. Cl.
CPC ............ *G06F 16/185* (2019.01); *G06F 16/13* (2019.01); *G06F 16/166* (2019.01); *G06F 16/1734* (2019.01)

(58) Field of Classification Search
None
See application file for complete search history.

(56) References Cited

U.S. PATENT DOCUMENTS

| | | | | |
|---|---|---|---|---|
| 2006/0123043 A1* | 6/2006 | Kwon | ..................... | G06F 16/16 707/999.102 |
| 2012/0215820 A1* | 8/2012 | Ogasawara | ............. | G06F 16/10 707/823 |
| 2014/0108475 A1* | 4/2014 | Yamada | ................... | G06F 16/21 707/829 |
| 2014/0317158 A1* | 10/2014 | Jiang | ....................... | G06F 16/13 707/822 |
| 2018/0101546 A1* | 4/2018 | Krasnow | ............. | G06F 16/1734 |
| 2020/0250149 A1* | 8/2020 | Bono | ................ | G06F 16/122 |

* cited by examiner

*Primary Examiner* — Son T Hoang
(74) *Attorney, Agent, or Firm* — Reches Patents

(57) ABSTRACT

A method for receiving paths information of a file system (FS) that is stored in a storage system, the method includes (a) receiving a request to receive paths information of at least part of the FS; wherein the request is received at a request point in time (PIT); (b) determining a current path name information of the at least part of the FS, wherein the determining is based on: (i) a FS paths data structure that includes path name information that is updated up to a last update PIT, and (ii) FS paths change information that is indicative of FS path names changes introduced between the last update PIT and the request PIT; wherein the FS paths change information associates at least one of excluded FSEs and included FSEs for each direct or indirect ancestor FSE of any FSE that had its path name changed between the last update PIT and the request PIT; and (c) generating a response to the request, wherein the generating of the response comprises using the current FS path name information of the FS.

8 Claims, 5 Drawing Sheets

FILESYSTEM PATHNAMES INDEXING USING PATH CHANGE ANNEX

BACKGROUND

File systems use pathnames to identify paths to files or directories through a hierarchy structure of directories.

When a user renames or moves files or directories, the pathnames of these files and directories are changed. Specifically, when a user renames a directory, all files and subdirectories, that descend from the renamed directory, need to be associated with new pathnames.

A storage system may need to manage a store of all the pathnames in a filesystem. Renaming or moving directories that form a root of sub-trees that includes multitude files or directories, each associated with a pathname, complicates the managing of the pathname store, when the multitude pathnames need to be changed. Particularly, when additional renames or moves are subsequently requested, to be applied on the same moved directories, on their parent directories, or on their child directories.

SUMMARY

There may be provided a system, a method and a non-transitory computer readable medium for filesystem pathnames indexing using path change annex.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1B:
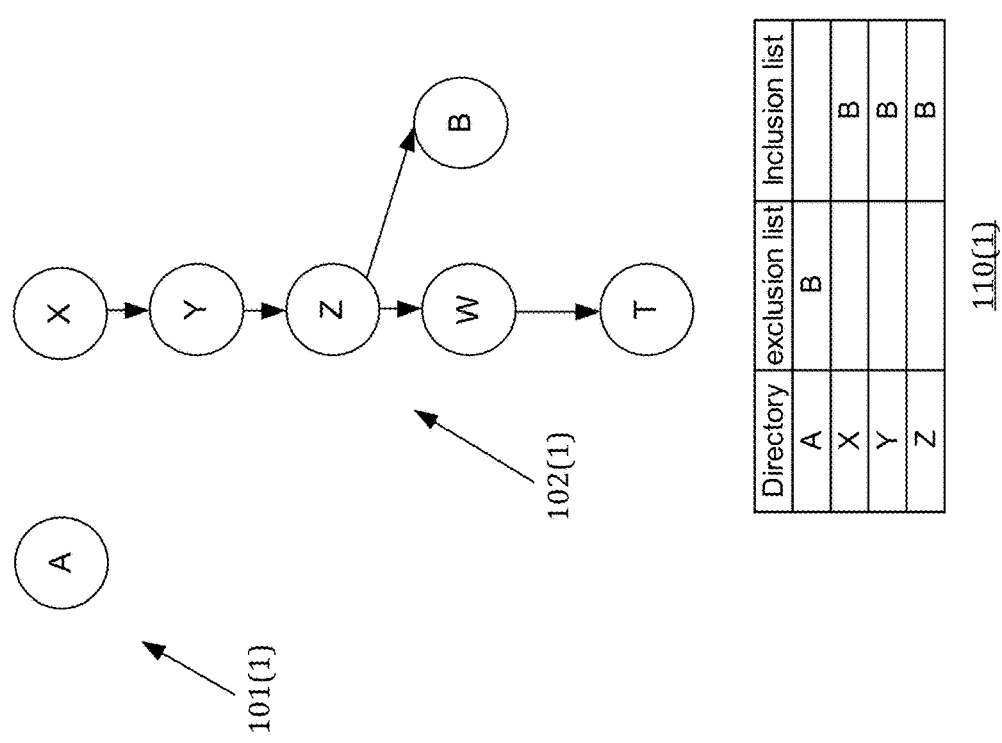
FIG. 1B is an example of a part of a file system and FS paths change information.

Any reference to "may be" should also refer to "may not be".

In the following detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A path change log temporarily stores records related to changes that were made to pathnames of directories, that usually occur upon rename and move operations of filesystem entities, for renaming or moving sub-trees that are located under a certain upper directory, so as to become hosted under a different directory. Both move and rename operations cause a change of a pathname of every directory and file that descends from the upper directory of the sub-tree.

The path change log is a data structure used in conjunction with a pathname index that may be a table that includes pathnames of all the file system entities (e.g., files, objects, directories) in a filesystem. An example for querying file system pathnames is illustrated in patent application Ser. No. 17/810,342 which is incorporated herein by reference.

Responses to queries for providing lists of files in the filesystem use the pathname index as the main source of filesystem pathnames, for searching and possibly filtering the requested files according to a top directory indicated by a file list query, where the paths of all the files under the top directory are to be part of the response. The responses to such queries are expected to be generated within a fraction of a second—for example within a few tens of milliseconds.

Renaming and moving directories (identified by directory pathnames) may require massive update of the pathname index, where the path of each file and directory under the top directory and its descendant directories needs to be updated to reflect the new location (path) of the file.

Updating the pathname index in response to every rename or move request may cause a significant latency in responding to the rename or move request. Particularly when the filesystem includes millions, billions or more files and directories, wherein a single moved directory may host thousands, millions or more files system entities: files, directories and sub-directories at different levels underneath the moved directory, wherein all the pathnames of the multitude file system entities, underneath the moved directory, need to be changed, and each changed pathname requires an access to the pathname index for updating the corresponding entry.

The path change log eliminates the need to update the pathname index upon every rename or move request, and is further adapted to cope with subsequent path changes that contradict former path changes, such as moving a directory back and forth (annulling a previous change), moving a directory and then again moving the directory, or one of its ancestor directories, or one or more of its descendant directories under another path, or any other sequence of changes that influence a directory and its descendants and/or ancestors more than once, within a short time period, before the first changes are admitted to the pathname index.

Instead of updating the pathname index in response to every rename or move request, the path changes are logged in the path change log so as to enable fast acknowledging of the rename or move requests without needing to update the pathname index, while enabling responding to sub-sequent file path queries, such as path list requests, that occur before the pathname index is updated with the changes logged in the path change log. A file path query for listing pathnames under a certain sub-tree is responded by using the information stored in the pathname index that is not fully updated but rather updated up to a certain point in time, and by using the path change log, which includes updates occurred since the certain point in time up to the current time, for adding relevant paths to the path list and eliminating irrelevant paths from the path list.

The pathname index may be updated after the paths influenced by the move or rename request are logged in the path change log (and the move or rename request is acknowledged to the requesting entity), by a background process, using the path change log. The update of the pathname index may be performed periodically or when the path change log reaches a certain size. Once the pathname index is updated with the changes logged in the path change log, the path change log can be reset, and a new version of the path change log can log new changes again.

The path change log is managed so as to address cases where multiple path change operations are performed for the same path or part of it, before the changes are applied to the pathname index, for example, a sub-tree can be moved to a first directory, and then moved again to a second directory that may belong to a different part of the tree, and then—may be moved again under the first directory or under one of its descendants or ancestors. Moving a path (indicated by a top directory) affects all the directories under the top directory that are also moved, including direct or indirect descendants. The term move refers hereinafter to both move and rename operations.

The path change log includes an entry for each influenced directory. An influenced directory is a directory that at least one of its direct or indirect descendant was moved under the sub-tree rooted by the influenced directory, or was moved out of the sub-tree. The influenced directory is "influenced" because a response to a future request to list filesystem entities (files, directories) that uses the pathname index as the main source of path information, will need to include directories that were moved under the influenced directory and to exclude directories that were removed from the influenced directory.

Each entry of an influenced directory in the path change log includes: (i) inclusion list of directories that were moved under the influenced directory, either directly, or indirectly—i.e., under a descendant of the influenced directory. The inclusion list includes only directories that were not originally under the influenced directory (originally—refers to the time before the point in time when the current version of the path change log was initiated or re-initiated, or in other words—since the previous time the path change log was applied to the pathname index and the path change log was reset); (ii) exclusion list of directories that were moved from the sub-tree under the influenced directory to another directory that is not under the sub-tree of the influenced directory. The exclusion list includes only directories that were originally under the sub-tree rooted by the influenced directory.

Every move operation (or rename) may involve an update of the path change log. The move operation includes an old pathname and a new pathname for the directory that is moved. The old pathname includes a list of old ancestors of the moved directory and the moved directory itself at the end of the list, where the new pathname includes a list of new ancestors. For example, the move of a directory d: a/d→x/y/z—means that directory d that resides under directory a (the old ancestor) is to be moved under directory z, where the directories x, y and z—all are the new ancestors of directory d.

The move operation includes updates of entries of new ancestor directories along the new path of the moved directory, wherein the updates are for including the moved directory under the new ancestor directories. The moved directory itself may have an entry in the path change log, indicating it was an influenced directory in a former move operation of one or more of its descendants. Therefore, in a case where the moved directory has an entry that includes pending path updates that were logged for the moved directory (and related to its descendants), the pending path updates should be also applied to entries of the new ancestor directories.

The move operation further includes updates of entries of old ancestors along the old path of the moved directory, wherein the updates are related to excluding the moved directory. In a case where the moved directory has an entry that includes pending path updates related to excluding descendants of the moved directory, the excluded descendants should be also applied to entries of the old ancestor directories.

More particularly, the updates related to the old path of the moved directory includes: (i) when the moved directory has an allocated entry in the path change log that includes an inclusion list (indicating new descendant directories that were moved under the moved directory, as part of a previous move request, where these descendant directories need to be moved again along with the moved directory), each directory in the inclusion list of the moved directory—is removed from the inclusion list of any old ancestor directory of the moved directory. Note that when the directories in the inclusion list were added to the moved directory—they were also added to its parents as well; (ii) when the moved directory has an entry in the path change log that includes an exclusion list (having removed descendant directories of the moved directory, that were excluded as part of a previous move request), each directory in the exclusion list of the moved directory—is removed from the exclusion list of any old ancestor directory of the moved directory. Note that when the directories in the exclusion list were added to the exclusion list of the moved directory—they were also added to its parents; (iii) when the moved directory itself is included in the inclusion list of an old ancestor directory (which means that the moved directory was moved to the old ancestor directory as part pf a former move request, after the current version of the path change log was established and is not documented in the pathname index)—the moved directory is removed from the inclusion list of any old ancestor directory. Otherwise—if the moved directory is not included in the inclusion list of the old ancestor directory—it is added to the exclusion list of the ancestor directory. This is repeated for every old ancestor directory in the old path.

The updates related to the new path includes: (i) when the moved directory has an allocated entry in the path change log that includes an inclusion list (having new descendant directories of the moved directory), each directory in the inclusion list of the moved directory—is added to the inclusion list of any new ancestor directory of the moved directory; (ii) when the moved directory has an entry in the path change log that includes an exclusion list (having old/removed descendant directories of the moved directory), each directory in the exclusion list of the moved directory—is added to the exclusion list of any new ancestor directory of the moved directory; (iii) when the moved directory itself is listed in the exclusion list of a new ancestor directory (which means that the moved directory was once under the new ancestor and was moved to another location)—the moved directory is removed from the exclusion list of the new ancestor directory. Otherwise—if the moved directory is not listed in the exclusion list of the new ancestor directory—it is added to the inclusion list of the ancestor directory. This is repeated for every new ancestor directory in the new path.

Figure 1A:
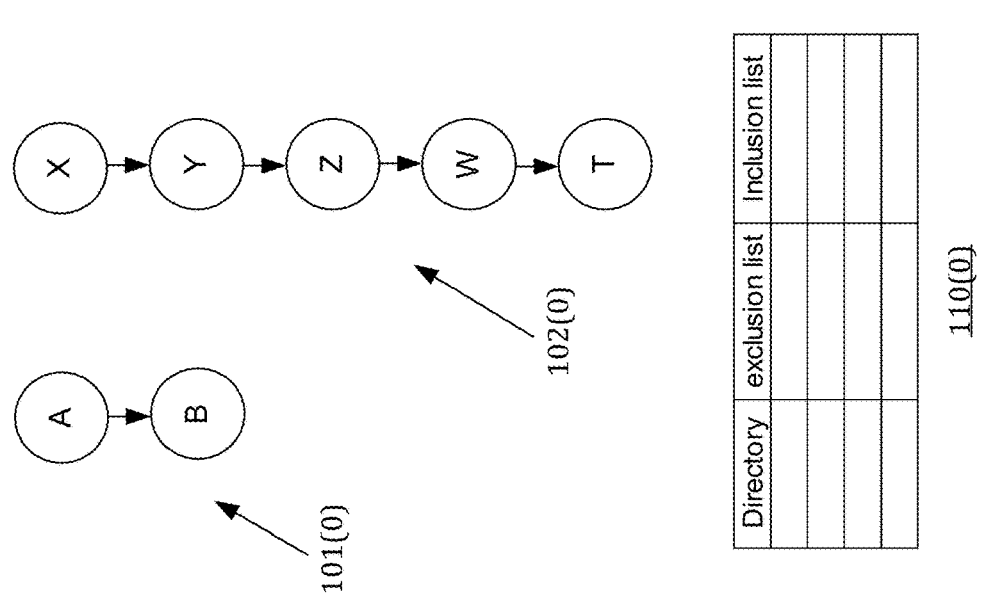
FIG. 1A is an example of a part of a file system.

FIGS. 1A-1D illustrates examples for multiple rename/move operations that change paths. FIG. 1A illustrates a tree 101(0) that includes a root directory A and a child directory B. A tree 102(0) includes a chain of directories in different hierarchies: a root directory X, and then—Y, Z, W and T. At this stage, the path change log 110(0) is empty, i.e., no moves/renames occurred so far. The locations of the different directories, at this stage, are referred to as the original locations of the directories, since they are documented in the pathname index and no change occurred since the last update of the pathname index. The directories may be indicated in the path change log by their directory unique identifier.

Assume that the following move is performed for moving directory B under directory Z: A/B→X/Y/Z to obtain the trees 101(1) and 102(1) illustrated in FIG. 1B. Path change log 110(1) includes an entry for directory A (the old parent) with directory B in its exclusion list, and an entry for directory Z (the new parent) with directory B in its inclusion list, and the same entries for any new ancestor directory (Y and X) in the upstream of the tree.

Now assume the following move is performed for moving directory W directly under directory X: X/Y/Z/W→X to obtain tree 102(2) illustrated in FIG. 1C. Path change log 110(2) is updated with W added to the exclusion list of the old ancestors Z and Y. Directory W is supposed to be excluded from old ancestor X as well, however since X is also the new ancestor (remain an ancestor of W regardless of the change in the depth of ancestry)—no change is needed in either the exclusion list or the inclusion list of X.

Now assume the following move is performed for moving directory Y directly under directory A: X/Y→A to obtain trees 101(3) and 102(3) illustrated in FIG. 1D. Path change log 110(3) is updated as follows: (i) The inclusion list of new ancestor directory A is updated to add directory Y. The exclusion list of old ancestor directory X is updated with directory Y. (ii) The inclusion list of directory Y, which indicates directory B, is needed to be applied to the new ancestor directory A. Since the exclusion list of A includes directory B (as a result of a previous removal of B from A)-B is only removed from the exclusion list of directory A. If the exclusion list of directory A did not include directory B, then B would have to be added to the inclusion list of A. (iii) The inclusion list of directory Y, is needed to be eliminated from the old ancestor directory X. Since the inclusion list of X includes directory B-B is only removed from the inclusion list of directory X. If the inclusion list of directory X did not include directory B, then B would have to be added to the exclusion list of X. (iv) The exclusion list of directory Y, which includes directory W, is needed to be applied to the new ancestor A. Therefore, directory W is added to the exclusion list of A.

A response to a query for listing pathnames under a certain directory uses the pathname index for obtaining an initial list of paths that match the conditions indicated in the query. The conditions of the query are changed to implement the exclusions and inclusions of the path change log.

Assuming a query is received for retrieving all the paths under a certain directory D. The pathname index includes a set of entries, V(D), for all the filesystem elements that resides (or used to reside) under directory D or its descendant directories. Directory D has an entry in the path change log with a set of included sub-directories, I(D), that is further associated with a set V(I(D))—that includes all the directories under the included sub-directories I(D). Directory D has an entry in the path change log with a set of excluded sub-directories, E(D), that is further associated with a set V(E(D))—that includes all the directories under the excluded sub-directories E(D).

The set of all elements under directory D in the new tree is provided by: (V(D) & ~V(E(D))) OR V(I(D)), i.e., eliminating paths of any directory in the set V(E(D)) and adding paths of any directory in the set V(I(D)). V(E(D)) can be expanded iteratively by recursively scanning the path change log for all the descendants of excluded directories in the set E(D). V(I(D)) can be expanded iteratively by scanning the path change log for all the descendants of included directories in the set I(D).

The pathname index is updated by a background process that may be executed periodically or when the path change log reaches a certain size or includes a certain number of entries indicating changes. Once the changes logged in the path change log are applied to the pathname index, the path change log can be reset, i.e., all the applied entries can be deleted, and a new version of the path change log is ready to be used for new move updates. For example, FIG. 1A illustrates an empty path change log 110(0), which may become empty after all the logged updates have been applied to the pathname index. Path change log 110(0) may be considered as a new version of the path change log that is ready for accommodating new path updates.

Figure 2:
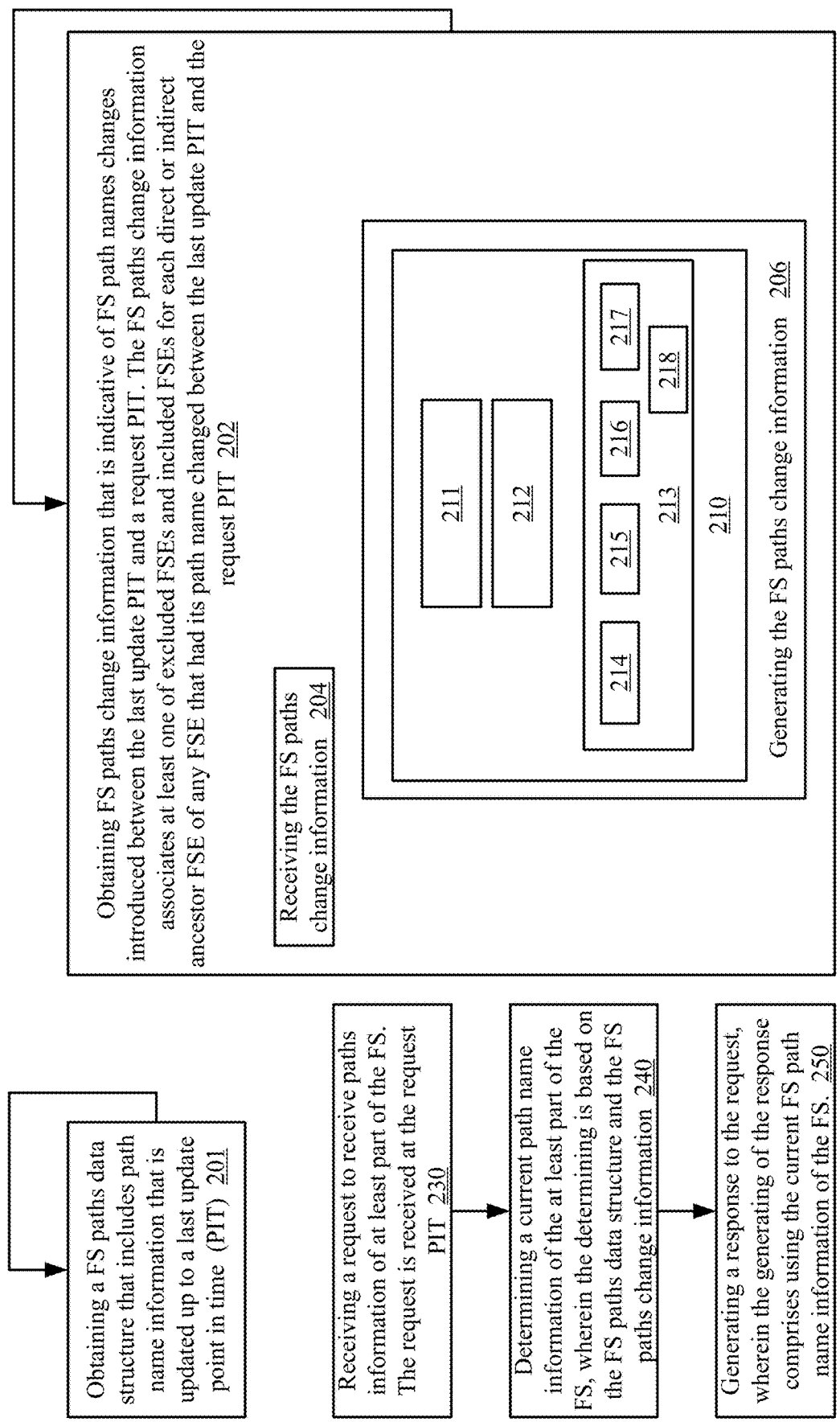
FIG. 2 is an example of a method.

FIG. 2 illustrates an example of method 200 for obtaining paths information of a file system (FS) that is stored in a storage system.

The term obtaining may include receiving and/or generating. The reception may be executed once or multiple times—to enable a reception of updated data structures and/or information. The generating may be executed one or multiple times—for providing updated data structures and/or information.

Method 200 may include step 201 of obtaining a FS paths data structure (e.g., the pathname index) that includes path name information that is updated up to a last update point in time (PIT). The FS paths data structure may be updated from time to time. The current explanation assumes that the last update PIT is the last update that occurred before the next steps of method 200.

Method 200 may include step 202 of obtaining FS paths change information (e.g., the path change log) that is indicative of FS path names changes introduced between the last update PIT and the current time. The FS paths change information associates at least one of excluded FSEs and included FSEs for each direct or indirect ancestor FSE of any FSE that had its path name changed between the last update PIT and the current time. The FSEs may be identified in the FS paths change information by using unique identifiers of directories, files or other FSEs in the filesystem. The unique identifier may have a compact presentation (e.g., 8 bytes, 16 bytes, 32 bytes, etc.), in contrast to the full pathname that is stored in the FS paths data structure.

The FS paths change information may be compact also in the sense that it includes compact content (for example list of excluded FSEs and/or list of excluded FSEs)—and/or that is does not include information about FSEs that did not have their path name changed since the last update PIT. Method 200 may include step 230 of receiving a request to receive paths information of at least part of the FS. The request is received at a request PIT. At the request PIT, the FS paths change information is indicative of FS path names changes introduced between the last update PIT and the request PIT. The request may identify a FSE as a root directory for obtaining all the FSEs under the identified FSE, with or without additional conditions fulfilled by the FSEs under the identified FSE.

Step 230 may be followed by step 240 of determining a current path name information of the at least part of the FS, wherein the determining is based on: (i) a FS paths data structure that includes path name information that is updated up to a last update PIT, and (ii) FS paths change information that is indicative of FS path names changes introduced between the last update PIT and the request PIT.

The FS paths change information may be used to amend (or translate) the information in the FS paths data structure—to provide the most updated path name, e.g., by omitting excluded FSEs from a list generated from the FS paths change information and adding included FSE under certain FSEs to the list generated from the FS paths change information. Alternatively, the FS paths change information may be used to amend the query identified by the request, for example by changing the Boolean expression of the query to include (e.g., using "OR" operator) and exclude (e.g., using "AND"+"NOT" operators) pathnames during the executing of the query.

Using the FS paths change information alleviates the need to constantly update the FS paths data structure—which is a time consuming task—especially when there are many FSEs under a FSE that was moved and changed its pathname—thereby save a significant amount of memory and processing resources and reduces the response time to requests to receive paths information.

Step 240 may be followed by step 250 of generating a response to the request, wherein the generating of the response comprises using the current FS path name information of the FS.

The response may include sending the requested paths information of at least part of the FS. The sending may include temporarily storing the requested paths information of at least part of the FS, transmitting the requested paths information of at least part of the FS over one or more communication links, and the like.

Step 202 may include step 204 of receiving the FS paths change information—without performing the FS path names changes.

Step 202 may include step 206 of generating the FS paths change information—by performing the FS path names changes that were introduced between the last update PIT and the request PIT. Each of the FS path names changes may be applied upon a request that causes a path change (e.g., rename or move)

Step 206 may include step 210 of performing a FS path name change of the FS path names changes by:
 a. Receiving a request to associate a FSE that has a source FSE ancestor (also referred to as "old ancestor directory") with a target FSE ancestor (also referred to as "new ancestor directory") (S211)
 b. Associating the FSE with the target FSE ancestor (S212)
 c. Updating at least one of excluded FSEs metadata (for example, the exclusion lists of FIGS. 1A-1D) and included FSE metadata (for example, the inclusion lists of FIGS. 1A-1D) of each one of the source FSE ancestor and the target FSE ancestor (S213).

Step 213 may include at least one of the following steps:
 a. Updating excluded FESs metadata and included FSE metadata of ancestors of each one of the source FSE ancestor and the target FSE ancestor (S214).
 b. Adding FSE excluded entities of the FSE to FSE excluded entities of the target FSE ancestor, and adding FSE included entities to FSE included entities of the target FSE ancestor (S215).
 c. Adding FSE excluded entities of the FSE to FSE included entities of the source FSE ancestor, and adding FSE included entities to FSE excluded entities of the source FSE ancestor (S216).
 d. Cancelling a FSE that is appears as a FSE included entity and as a FSE excluded entity (S217).
 e. Disassociating from the source FSE ancestor, any FSE excluded entity and any FSE included entity associated with the FSE (S218).
 f. Any of the steps 214-217 may be applied to any indirect target FSE ancestor and source FSE ancestor that belong to the hierarchies above the FSE whose FS path name is changed, i.e., ancestors above the source and target direct ancestors.

Figure 3:
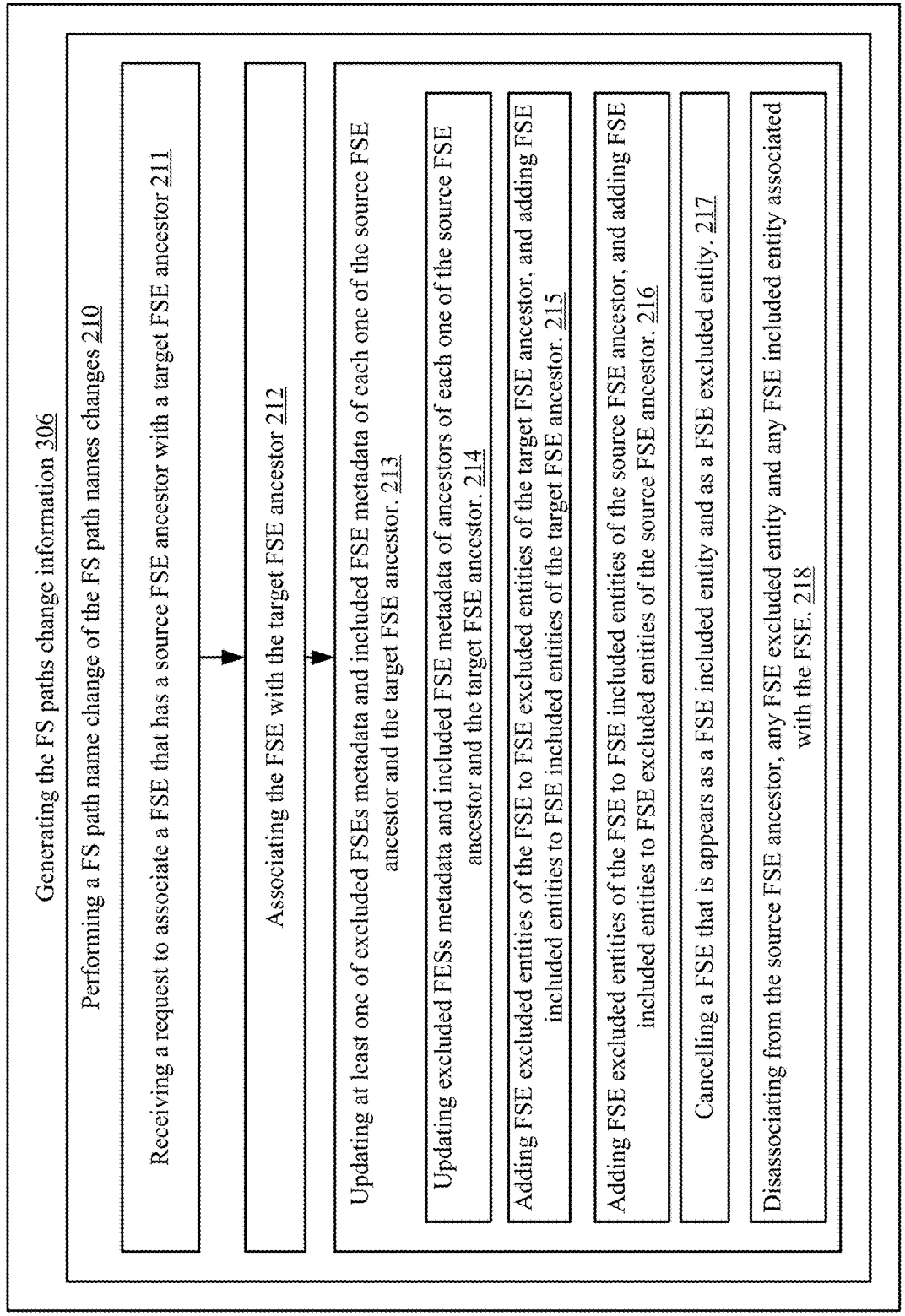
FIG. 3 is an example of a method.

FIG. 3 illustrates method 300 for generating the FS paths data structure.

Method 300 may include step 306 of generating the FS paths change information—by performing the FS path names changes that were introduced between the last update PIT and the request PIT.

Step 306 may include step 210 of performing a FS path name change of the FS path names changes by:
 a. Receiving a request to associate a FSE that has a source FSE ancestor with a target FSE ancestor (S211)
 b. Associating the FSE with the target FSE ancestor (S212).
 c. Updating at least one of excluded FSEs metadata and included FSE metadata of each one of the source FSE ancestor and the target FSE ancestor (S213).

These updates are iterated to the indirect source FSE ancestors and target FSE ancestors above the direct source FSE ancestor and direct target FSE ancestor In any of the updates—an FSE that appears as excluded FSE and an included FSE of the same FSE may be cancelled.

In FIG. 1B, FSE B that was previously associated with FSE source ancestor A is associated with FSE target ancestor Z. The FS paths change information is table 110(1) that includes entries related to the impacted FSEs-FSE source ancestor A, FSE target ancestor Z and FSEs X and Y that are FSE ancestors of FSE target ancestor Z—and may be referred to as indirect ancestors of FSE B.

Figure 1C:
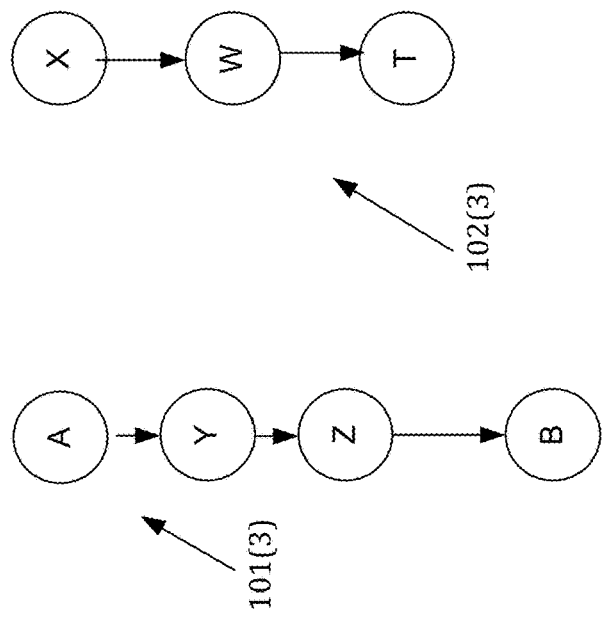
FIG. 1C is an example of a part of a file system and FS paths change information.

In FIG. 1C—FSE W (and his descendant FSE-FSE T) that was previously associated with FSE source ancestor Z is associated with FSE target ancestor X. The FS paths change information is table 110(2) which includes the same impacted FSEs as table 110(1)—although the roles of some of the impacted FSEs were changes. It should be noted that the FSE T that is a descendant of FSE W is not listed in table 110(2)—which may save storage and processing resources.

Figure 1D:
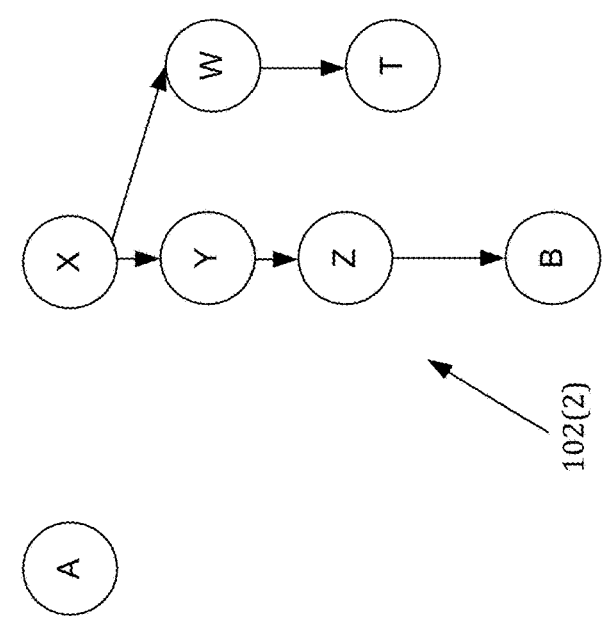
FIG. 1D is an example of a part of a file system and FS paths change information.

In FIG. 1D—FSE Y (and his descendant FSEs-FSE Z and FSE B) that was previously associated with FSE source ancestor X is associated with FSE target ancestor A. The FS paths change information is table 110(3) which includes the same impacted FSEs as table 110(2)—although the roles of some of the impacted FSEs were changes. It should be noted that the FSE B and FSE Z that were descendants of FSE Y are not listed in table 110(3)—which may save storage and processing resources.

Step 213 may include at least one of the following steps:
  a. Updating excluded FESs metadata and included FSE metadata of ancestors of each one of the source FSE ancestor and the target FSE ancestor (S214).
  b. Adding FSE excluded entities of the FSE to FSE excluded entities of the target FSE ancestor, and adding FSE included entities to FSE included entities of the target FSE ancestor (S215).
  c. Adding FSE excluded entities of the FSE to FSE included entities of the source FSE ancestor, and adding FSE included entities to FSE excluded entities of the source FSE ancestor (S216).
  d. Cancelling a FSE that is appears as a FSE included entity and as a FSE excluded entity (S217).
  e. Disassociating from the source FSE ancestor, any FSE excluded entity and any FSE included entity associated with the FSE (S218).

Referring to FIG. 1D—and especially to the difference between tables 110(2) and 110(3)—that reflects the path change that included associating FSE Y that was previously associated with FSE source ancestor X and now associated with FSE target ancestor A:
  a. The status of FSE target ancestor A was updated by (i) adding FSE Y as an included FSE of FSE target ancestor A, and (ii) adding to the previous status of FSE A (the exclusion and inclusion entries of FSE A of table 110(2)) the previous status of FSE Y—as FSE Y is now a descendant of FSE A.
  b. The status of FSE source ancestor X was updated by (i) adding FSE Y as an excluded FSE of FSE source ancestor X, and (ii) deleting from the previous status of FSE X (the exclusion and inclusion entries of FSE X of table 110(2)) the previous status of FSE Y—as FSE Y seized to be a descendant of FSE X. The "deletion" include adding descendent FSEs of FSE Y to the included FSEs of FSE source ancestor X, and adding included FSEs of FSE Y to the excluded FSEs of FSE source ancestor X.

Figure 4:
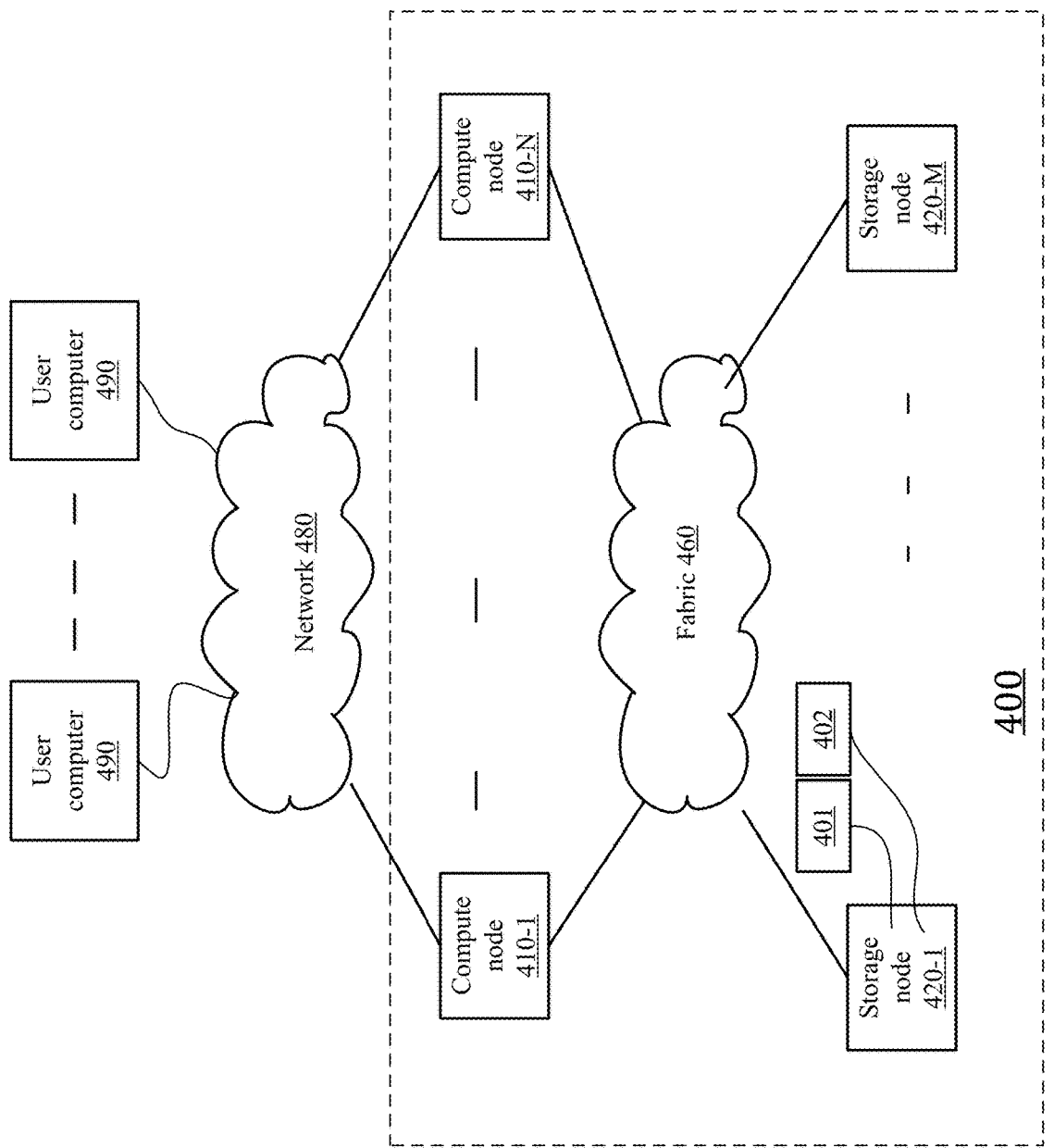
FIG. 4 is an example of a system.

FIG. 4 shows an example diagram of a storage system 400 according to the disclosed embodiments.

The storage system 400 includes a number of N compute nodes 410-1 through 410-N.

The storage system 400 also includes a number of M storage nodes 420-1 through 420-M. The computer nodes 410 and the storage nodes 420 are connected through a communication fabric 460. M may equal N or may differ from N.

In an embodiment, a compute node 410 employs and/or includes multiple compute cores and may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 410 does not require any dedicated hardware.

A compute node 410 is configured to perform tasks related the execution of method 200 and/or method 300. In an embodiment, each compute node 410 may interface one or more client devices (such as user computer 490). The compute nodes may receive from the client devices requests such as requests to receive paths information and requests that cause changes in FSEs pathnames, such as a rename or a move requests.

The compute nodes interface the clients via one or more networks, such as network 480. The network may be, but is not limited to, the Internet, the world-wide-web (WWW), a local area network (LAN), a wide area network (WAN), and the like. The response to the query may be sent via the interface.

The storage nodes include various storage devices, such as SSDs (Solid State Drives), NVRAM (Non-volatile random-access memory), RAM (Random Access Memory), etc. One or more storage nodes stores the FS paths data structure 401 and the FS paths change information 402. Alternatively, FS paths data structure 401 and the FS paths change information 402 may be stored in one or more compute nodes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for receiving paths information of a file system (FS) that is stored in a storage system, the method comprises:
   receiving a request to receive paths information of at least part of the FS; wherein the request is received at a request point in time (PIT);
   determining a current path name information of the at least part of the FS, wherein the determining is based on: (i) a FS paths data structure that includes path name information that is updated up to a last update PIT, and (ii) FS paths change information that is indicative of FS path names changes introduced between the last update PIT and the request PIT; wherein the FS paths change information associates at least one of excluded FSEs (filesystem entities) and included FSEs for each direct or indirect ancestor FSE of any FSE that had its path name changed between the last update PIT and the request PIT;
   generating a response to the request, wherein the generating of the response comprises using the current FS path name information of the FS; and
   performing the FS path names changes that were introduced between the last update PIT and the request PIT, wherein a FS path name change of the FS path names changes comprises:
     (i) receiving a request to associate a FSE that has a source FSE ancestor with a target FSE ancestor;
     (ii) associating the FSE with the target FSE ancestor; and
     (iii) updating at least one of excluded FSEs metadata and included FSE metadata of each one of the source FSE ancestor and the target FSE ancestor; wherein the updating of the excluded FSEs metadata of the target FSE ancestor includes adding FSE excluded entities of the FSE to FSE excluded entities of the target FSE ancestor; wherein the updating of the included FSEs metadata of the target FSE ancestor includes adding FSE included entities to FSE included entities of the target FSE ancestor.

2. The method according to claim 1 comprising adding FSE excluded entities of the FSE to FSE included entities of the source FSE ancestor, and adding FSE included entities to FSE excluded entities of the source FSE ancestor.

3. The method according to claim 1 comprising cancelling a FSE that is appears as a FSE included entity and as a FSE excluded entity.

4. The method according to claim 1 comprising disassociating from the source FSE ancestor, any FSE excluded entity and any FSE included entity associated with the FSE.

5. A non-transitory computer readable medium for receiving paths information of a file system (FS) that is stored in a storage system, the non-transitory computer readable medium that stores instructions for:
   receiving a request to receive paths information of at least part of the FS; wherein the request is received at a request point in time (PIT);
   determining a current path name information of the at least part of the FS, wherein the determining is based on: (i) a FS paths data structure that includes path name information that is updated up to a last update PIT, and (ii) FS paths change information that is indicative of FS path names changes introduced between the last update PIT and the request PIT; wherein the FS paths change information associates at least one of excluded FSEs (filesystem entities) and included FSEs for each direct or indirect ancestor FSE of any FSE that had its path name changed between the last update PIT and the request PIT;

generating a response to the request, wherein the generating of the response comprises using the current FS path name information of the FS; and performing the FS path names changes that were introduced between the last update PIT and the request PIT, wherein an FS path name change of the FS path names changes comprises:
  (i) receiving a request to associate a FSE that has a source FSE ancestor with a target FSE ancestor;
  (ii) associating the FSE with the target FSE ancestor; and
  (iii) updating at least one of excluded FSEs metadata and included FSE metadata of each one of the source FSE ancestor and the target FSE ancestor; wherein the updating of the excluded FSEs metadata of the target FSE ancestor includes adding FSE excluded entities of the FSE to FSE excluded entities of the target FSE ancestor; wherein the updating of the included FSEs metadata of the target FSE ancestor includes adding FSE included entities to FSE included entities of the target FSE ancestor.

6. The non-transitory computer readable medium according to claim 5 that stores instructions for adding FSE excluded entities of the FSE to FSE included entities of the source FSE ancestor, and adding FSE included entities to FSE excluded entities of the source FSE ancestor.

7. The non-transitory computer readable medium according to claim 5 that stores instructions for cancelling a FSE that is appears as a FSE included entity and as a FSE excluded entity.

8. The non-transitory computer readable medium according to claim 5 that stores instructions for disassociating from the source FSE ancestor, any FSE excluded entity and any FSE included entity associated with the FSE.

\* \* \* \* \*